(No Model.) 2 Sheets—Sheet 1.

G. H. BROWER.
EVAPORATOR.

No. 442,478. Patented Dec. 9, 1890.

WITNESSES:
J. C. Clark
C. Sedgwick

INVENTOR:
G. H. Brower
BY Munn & Co.
ATTORNEYS (No Model.) 2 Sheets—Sheet 2.

G. H. BROWER.
EVAPORATOR.

No. 442,478. Patented Dec. 9, 1890.

WITNESSES:

INVENTOR.
G. H. Brower
BY Munn & Co
ATTORNEYS

UNITED STATES PATENT OFFICE.

GEORGE H. BROWER, OF ROANN, INDIANA.

EVAPORATOR.

SPECIFICATION forming part of Letters Patent No. 442,478, dated December 9, 1890.

Application filed June 19, 1889. Serial No. 314,805. (No model.)

*To all whom it may concern:*

Be it known that I, GEORGE H. BROWER, of Roann, in the county of Wabash and State of Indiana, have invented a new and Improved Evaporator, of which the following is a full, clear, and exact description.

The object of the invention is to provide a new and improved evaporator for rapidly and effectively producing pure sirup from saccharine juices.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
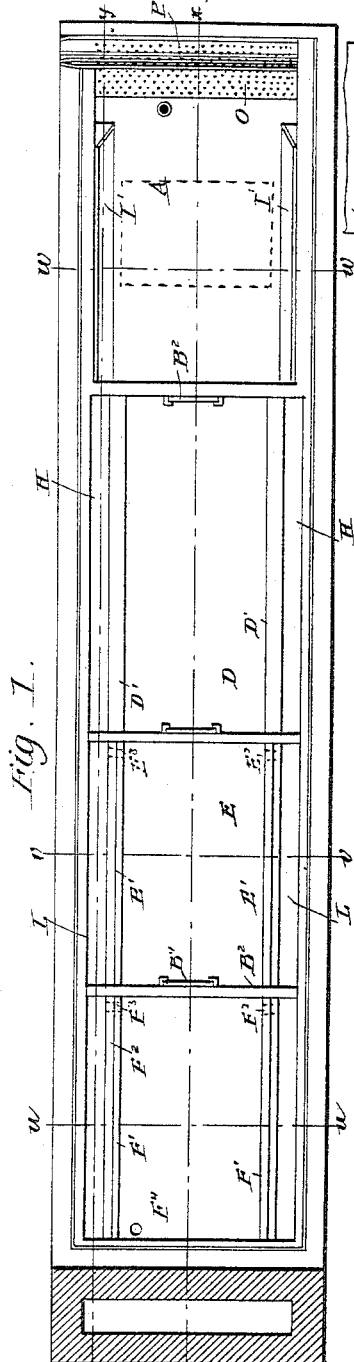
Figure 2:
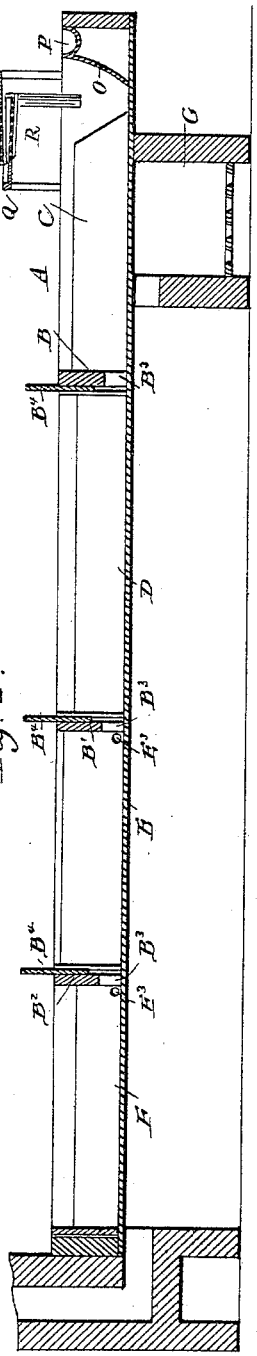
Figure 3:
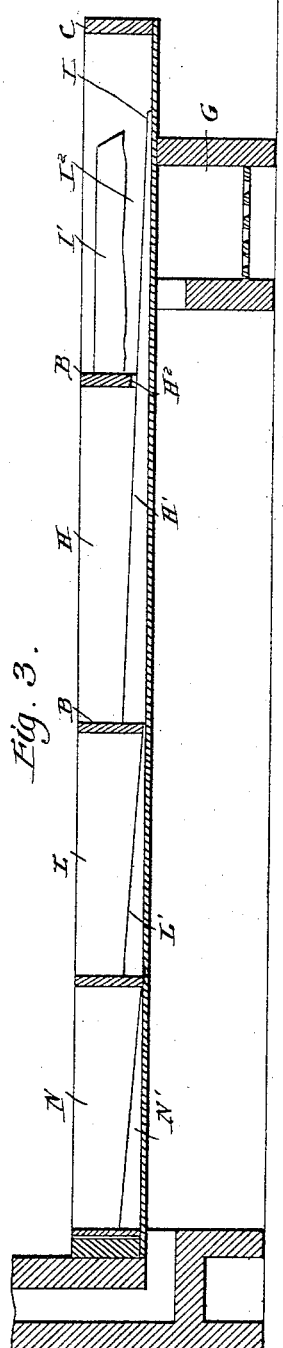
Figure 4:
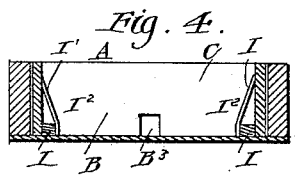
Figure 5:
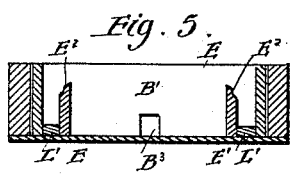
Figure 6:
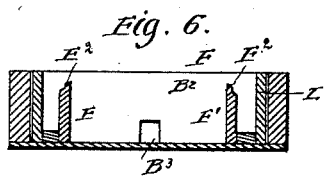
Figure 7:
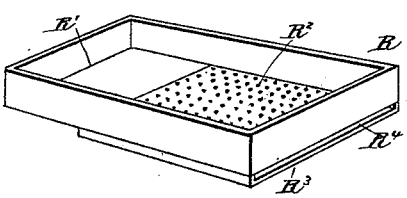

Figure 1 is a plan view of the evaporator. Fig. 2 is a sectional side elevation of the same on the line $x\ x$ of Fig. 1. Fig. 3 is a like view of the same on the line $y\ y$ of Fig. 1. Fig. 4 is a transverse section on line $w\ w$ of Fig. 1. Fig. 5 is a similar section on line $r\ r$ of Fig. 1. Fig. 6 is a similar view on line $u\ u$, Fig. 1. Fig. 7 is a perspective view of one of the pans of the strainer.

The improved evaporator is provided with a pan A, set in a suitable foundation and provided with partitions B, B', and B², dividing the pan into several compartments C, D, E, and F. Under the evaporator is located a furnace G of any approved construction and serving to heat the contents of the pan A throughout its length. As shown by dotted lines in Fig. 1, the front of the furnace G is narrower than the pan A by the width of the passage-ways I². In other words, the latter overhang the sides of the furnace, and are hence not heated so highly as the intervening middle portion of compartment C. The furnace has the usual exit and chimney at its rear end, as shown in Fig. 2. Each of the partitions B, B', and B² is provided in its middle at the bottom with an opening B³, adapted to be closed by a gate B⁴, mounted to slide vertically in suitable guideways formed in the respective partitions. The openings B³ in the partitions B, B', and B² serve to connect the adjoining compartments with each other. A trough H is arranged on each side of compartment D, and the walls D' form the inner sides of such troughs, as shown. The bottoms H' of the latter are inclined from rear to front, (see Fig. 3,) and, passing through an opening H² in partition B, extend forward alongside compartment C. A passage-way I² is formed on each side of compartment C by means of a metallic sheet I', which is inclined outward from the bottom, as shown in Figs. 1 and 4. These passage-ways I² are open at the front end and communicate by openings H² (in partition B) with the troughs H, placed alongside the second compartment D.

The walls E' of the compartment E are provided on top with steps E², extending longitudinally and downward to the outside, Fig. 5. A trough L is arranged on each side of compartment E, and the walls E' of the latter form the inner sides of the troughs. Each of the latter has an inclined bottom L', extending from the partition B² downward to the partition B'. At the lower end of each inclined bottom L' is formed an aperture E³ in the respective walls E', so that the lower end of each trough L is in communication with the compartment E.

The compartment F has its walls F' provided with steps F², similar to the steps E². On the outside of each wall F' is formed a trough N, provided with an inclined bottom N', extending from the rear end of the pan A downward to the partition B². An aperture F³ in each wall F' connects the lower end of the trough N with the interior of the compartment F.

On the front end of the compartment C is held an upwardly-curved and transversely-extending perforated partition-plate O, connecting at its upper end with a perforated trough P, extending transversely and leading to one side of the pan A and serving to carry off the scum. A filter Q discharges into the first compartment C and comprises a number of filtering-pans R, each provided with a bottom made partly solid at its upper end R' and formed partly of a sieve R², below which is held a solid bottom R³, closed at its upper end and opening at its lower end, as shown in Fig. 7. The several pans R are placed in an inclined position, and the succeeding ones extend in opposite directions, as is plainly shown in Fig. 2. By this arrangement the lower end of the sieve $R^2$ and its fixed bottom $R^3$ discharge onto the fixed bottom $R'$ of the next following pan. The lowermost pan R discharges into the compartment C, while the uppermost pan is connected with a tank S, containing the juice. The juice passing from the tank S through the filter Q is thus filtered before entering the compartment C.

The operation is as follows: The cold juice enters in a constant stream the front end of the compartment C after it has passed through the filter Q. The gate $B^4$ in the partition $B'$ is closed, so that the compartments E and F are in communication with each other, and said compartments are wholly or partly filled with water. The gate $B^4$ in the partition B is open, so that the juice entering the compartment C can flow into the compartment D. The juice in the compartments C and D is subjected to the heat arising from the furnace G until it is well purified and reduced to about 20° to 25° Baumé. As the juice passes backward toward the compartment D it boils up and throws the coarser impurities toward the forward end of the compartment, where it is kept from boiling by the entering cold juice, aided by the lower temperature of the passage $I^2$ on each side of the compartment C. The juice then passes through the opening $B^3$ in the partition B to the compartment D, from which a portion boils over into the side troughs, carrying the scum and other impurities with it. The juice in the troughs is somewhat condensed and flows forward through the openings in the partition B into the passage $I^2$ and from the latter to the front end of the compartment C, in which is formed a quiet space by the cold juice coming from the filter Q, so that the scum and other impurities can be skimmed as often as desired, the sirup passing back into compartment A, as above described.

In regard to the passages $I^2$, it will be understood that as they are straight they carry the overflow of compartment D to the compartment C without clogging. As soon as the overflow passes from the troughs into the passages $I^2$ it is heated, as the metal cover $I'$ of each passage is surrounded by the boiling juice in the compartment C, and consequently the sirup passing through the passage $I^2$ is heated to a boiling-point when it enters the compartment C. As the passages $I^2$ are steam-tight, they aid in the coagulation of the scum, and as they absorb considerable heat from the boiling juice the latter is prevented from boiling over the sides of the compartment C.

The boiling of the juice is confined more to the middle of the compartment C, as the entering of the cold juice from the filter Q, aided by the absorption of heat by the passages $I^2$, forms a quiet space in the front end of the compartment C for the collection of the scum from the compartment C and from the closed passages $I^2$, as before described. The scum is raked into the perforated trough or strainer P, and any juice raked into the same with the scum passes back into the compartment C by the perforations in the bottom of the trough P. When the sirup in the compartment D has been reduced to 20° to 25° Baumé, the water in the compartment E is transferred to the compartment F, and the sirup is admitted to the compartment E by opening the gate $B^4$ in the partition $B'$. Enough sirup is admitted to fill the compartment E to the depth of about one and one-half inch, after which the gate is again closed. The heat being greatest in the middle of the pan, the sirup boils most violently there, and flows laterally, carrying the scum over the walls $E'$ into the side troughs. In so doing the sirup passes over the steps $E^2$ and is exposed to the air for a slightly longer time than it would be in the absence of such steps. Hence the sirup that enters the side troughs is cooled and condensed, so that it has greater specific gravity, and therefore flows back again through holes $E^3$ in walls $E'$ into the same compartment from which it came. Thus the scum is for the most part removed and collected and retained in the side troughs. The sirup from the compartment is finally transferred to compartment F, the water in the latter being previously removed, through the gate $B^4$ in partition $B^2$ being first opened and then closed. The compartment E is then filled as before. The sirups in the compartments E and F are at all times kept separate.

The treatment of the sirup in the finishing-compartment F is the same as in the other compartment, and the finished sirup is finally run out through the opening $F^4$.

The perforated plate O, joined to trough P, aids in straining any juice passing over it when the scum is raked into the trough P.

Having thus fully described my invention, I claim as new and desire to secure by Letters Patent—

1. The combination, with the compartment E, of side troughs L L and sides $E'$, having their top edges constructed in steps, as and for the purpose specified.

2. In an evaporator, the combination, with the compartment C, compartment D, and side troughs having openings at the front end, of the passage-ways $I^2$, having metal covers and inclined bottoms, substantially as shown and described.

GEORGE H. BROWER.

Witnesses:
JOHN W. TAYLOR,
H. L. ROBERTSON.